No. 729,385. PATENTED MAY 26, 1903.
W. MORRISON.
VEHICLE WHEEL.
APPLICATION FILED JAN. 8, 1900.
NO MODEL. 3 SHEETS—SHEET 1.

Witnesses, Inventor,
William Morrison,
By Offield, Towle & Linthicum
Attys.

No. 729,385. PATENTED MAY 26, 1903.
W. MORRISON.
VEHICLE WHEEL.
APPLICATION FILED JAN. 8, 1900.
NO MODEL. 3 SHEETS—SHEET 2.
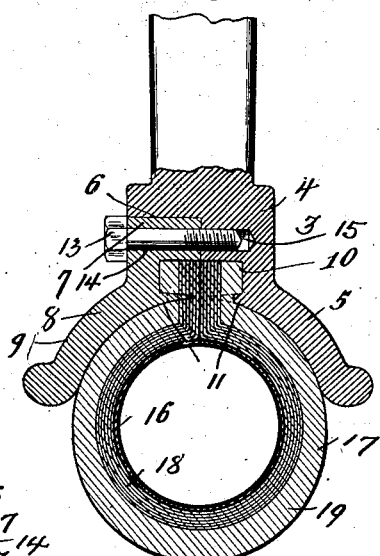
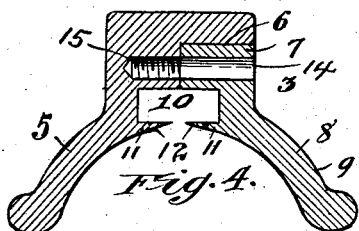
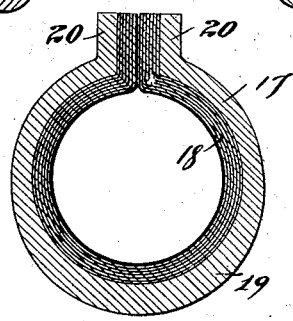
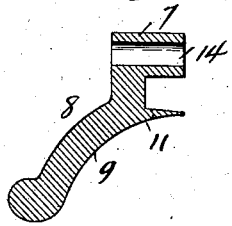
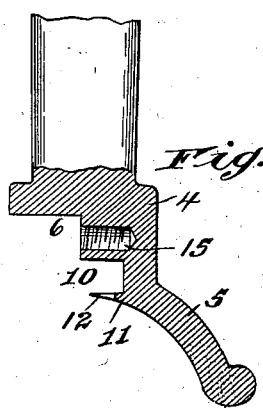
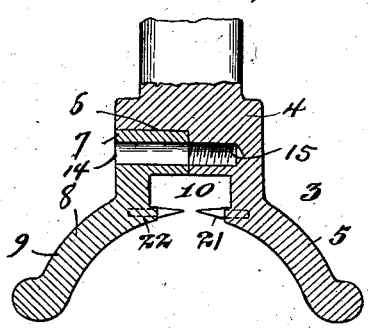
Witnesses,
Inventor,
William Morrison,
By Offield, Towle & Linthicum,
Att'ys.

No. 729,385. PATENTED MAY 26, 1903.
W. MORRISON.
VEHICLE WHEEL.
APPLICATION FILED JAN. 8, 1900.
NO MODEL. 3 SHEETS—SHEET 3.
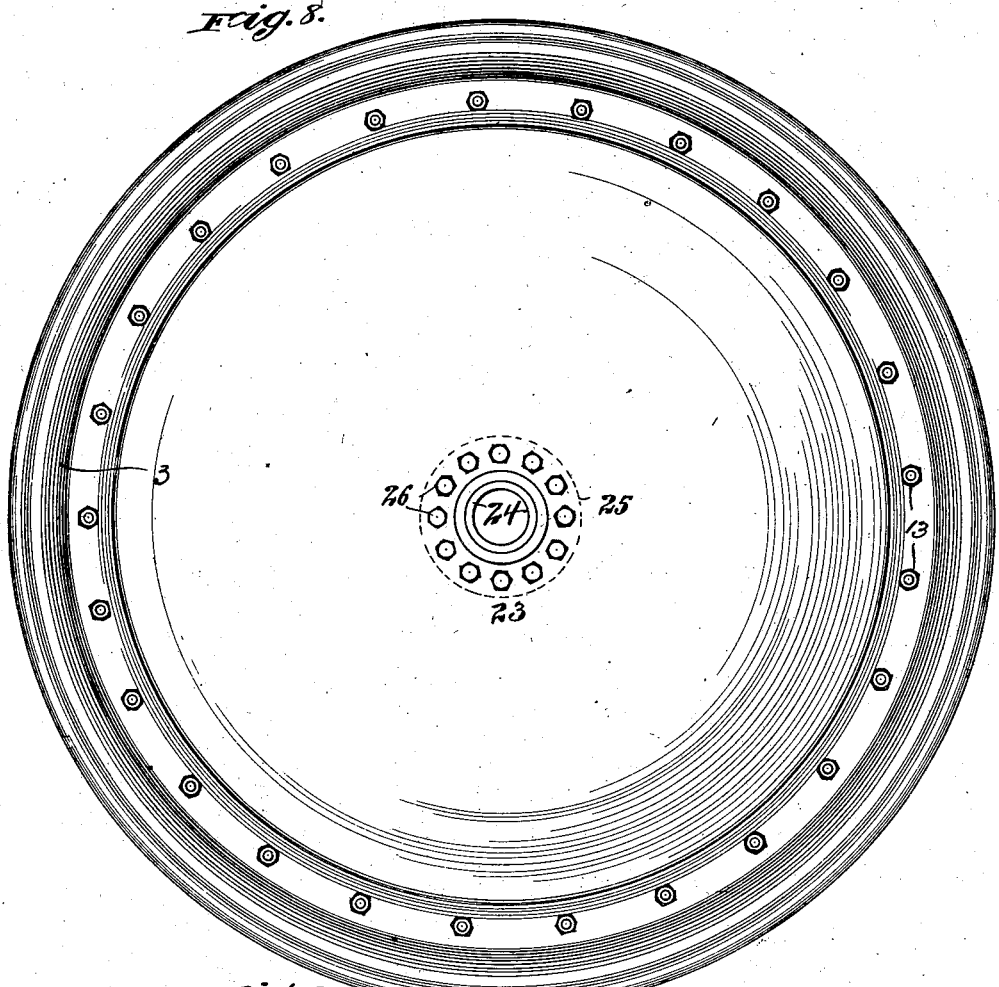
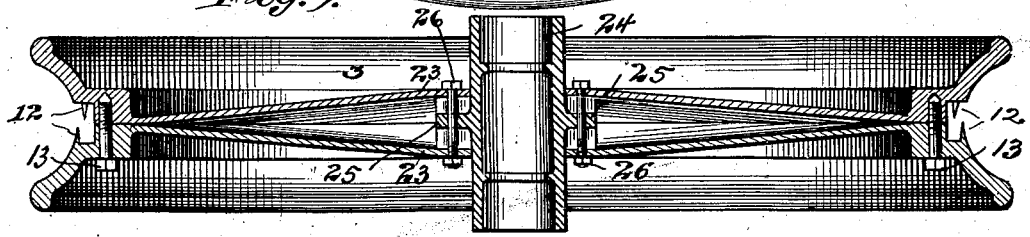
Witnesses. Inventor,
William Morrison,
By Offield, Towle & Linthicum,
Attys.

No. 729,385.

Patented May 26, 1903.

UNITED STATES PATENT OFFICE.

WILLIAM MORRISON, OF CHICAGO, ILLINOIS, ASSIGNOR TO THE HELIOS-UPTON COMPANY, OF CHICAGO, ILLINOIS, A CORPORATION OF NEW JERSEY.

VEHICLE-WHEEL.

SPECIFICATION forming part of Letters Patent No. 729,385, dated May 26, 1903.

Application filed January 8, 1900. Serial No. 773. (No model.)

*To all whom it may concern:*

Be it known that I, WILLIAM MORRISON, a citizen of the United States, residing at Chicago, in the county of Cook and State of Illinois, have invented certain new and useful Improvements in Vehicle-Wheels, of which the following is a specification.

This invention relates to vehicle-wheels, and more particularly to wheels adapted for use on motor-carriages or automobiles, and has for its object to provide a construction wherein the tire is connected to the wheel in such a way as to properly withstand the excessive strains due to the great weight of the vehicle and to the application of the motive power to the wheels, and whereby the creeping of the tire in the rim of the wheel will be effectually prevented, while at the same time the tire may be readily disconnected from the wheel for purposes of inspection or repair.

To these ends the invention consists in certain novel features which I will now proceed to describe, and will then particularly point out in the claims.

Figure 1:
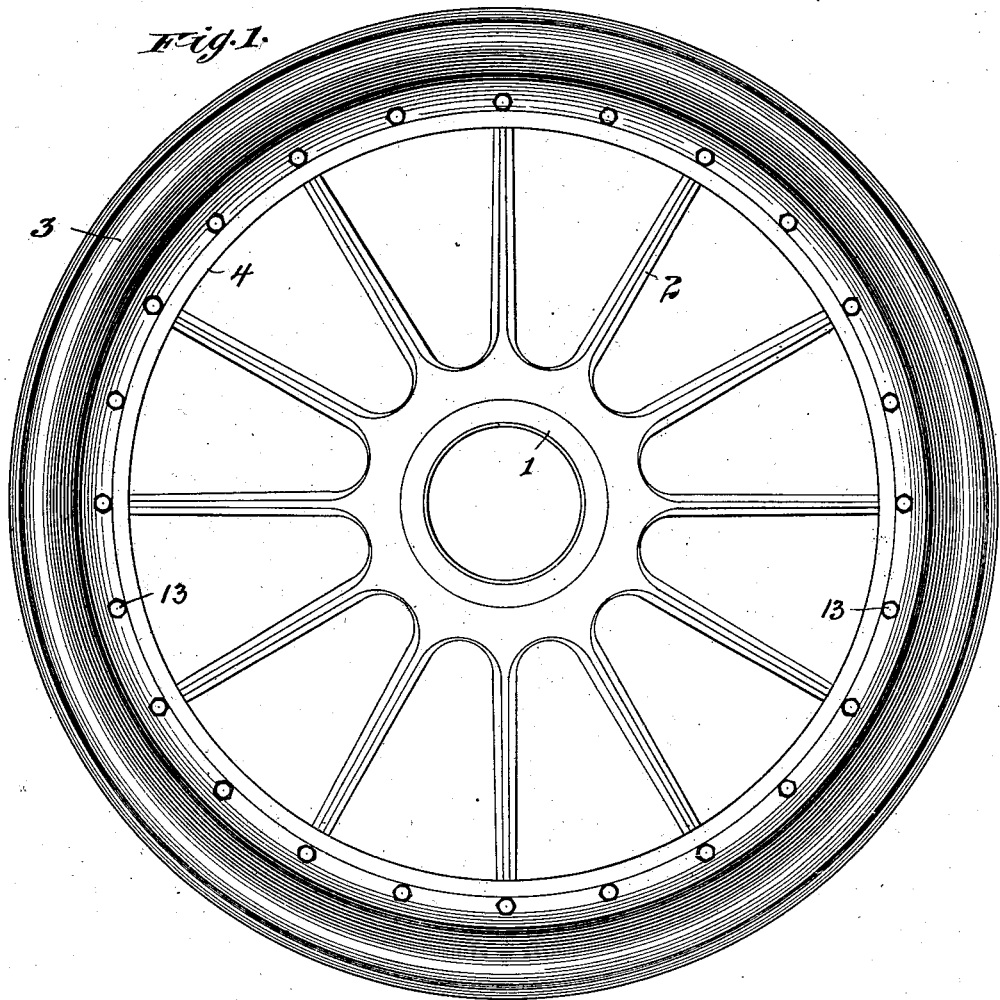
Figure 2:
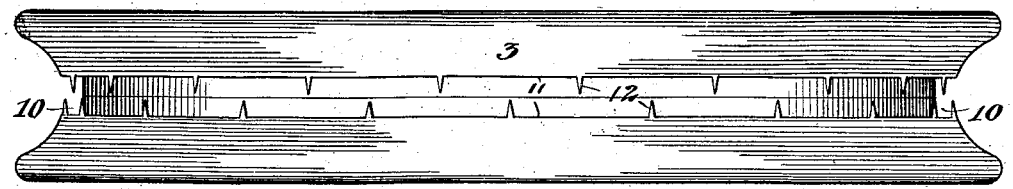

In the accompanying drawings, Figure 1 is a side elevation of a wheel embodying my invention in one form. Fig. 2 is a plan view of the same. Fig. 3 is a detail sectional view through the rim and tire, showing the several parts assembled. Fig. 4 is a sectional view of the tire-sheath detached. Figs. 5 and 6 are detail sectional views of the separable portions of the wheel proper detached. Fig. 7 is a view similar to Fig. 3, but with the tire omitted, illustrating a modification of my invention. Fig. 8 is a view similar to Fig. 1, illustrating a modified form of wheel embodying my invention. Fig. 9 is a transverse sectional view of the same; and Fig. 10 is a view similar to Fig. 7, illustrating another modified embodiment of my invention.

Referring first to the construction shown in Figs. 1 to 6 of the drawings, 1 indicates the hub of a wheel, and 2 the spokes, these parts being of any approved construction and being preferably of metal. 3 indicates the rim as a whole, said rim being divided into two separable parts, of which in the present instance one is permanently connected with the spokes, while the other is separate and separable therefrom. The former portion is composed of a base or inner portion 4, which is integral with the spokes, and an outwardly-flaring curved marginal portion 5. The base portion 4 is rabbeted or cut away, as indicated at 6, to receive the annular base portion 7 of the removable section 8, which latter has an outwardly-flaring curved portion 9, corresponding with the similar part 5 of the first-mentioned section. The inner or adjacent faces of the two sections are recessed or cut away at the junction of the base and flaring portions to form an annular groove 10, preferably rectangular in cross-section and opening radially outward from the center of the wheel. Along each margin of the mouth of this groove there is provided an inwardly-extending rib 11, one of these ribs being carried by each of the sections of the rim and serving to constrict or narrow the mouth of the groove. There are also provided at intervals projections 12, located at the opposite margins of the mouth of the groove and extending transversely across the same, their arrangement being alternate, as indicated in Fig. 2 of the drawings. These projections are preferably in the form of sharp points, as shown, and terminating at a short distance from the central line of the groove. The two sections are detachably connected in any suitable manner—as, for instance, by means of screw-bolts 13, passing through suitable unthreaded apertures 14 in the removable section and screwing into threaded apertures 15 in the permanently-connected portion of the rim.

The tire employed is of the detachable double-tube type and comprises an internal air-tube 16 and a separate and separable outer sheath 17, which latter is preferably constructed, as shown, of an inner layer or layers of fabric 18 and an external covering of rubber 19. This sheath is circumferentially rifted at its inner portion, and the margins of the sheath are extended radially, as shown at 20, the projection thus formed on the sheath being of a size and shape corresponding with the size and shape of the groove or seat 10 in the rim of the wheel.

In assembling the parts of the wheel the air-tube may be placed in position within the sheath and this latter may then be placed in position against the non-detachable section of the rim and forced to its seat as far as possible. The detachable section 8 of the rim is then placed in position against the tire and the non-detachable portion of the rim, and by means of the bolts 13 the two portions of the rim may be drawn together into the position shown in detail in Fig. 3 of the drawings. In this position of the parts the tire is firmly held in position on the wheel, not only by being gripped between the ribs 11, which are in themselves sufficient under ordinary circumstances to prevent movement of the tire relatively to the wheel, but also by means of the projections 12, which enter the radially-extended edges 20 of the sheath and absolutely preclude any creeping or other movement of the tire relatively to the rim of the wheel. When it is desired to have access to the air-tube for any purpose, the removable section 8 of the rim is readily detached by unscrewing the bolts 13, whereupon the sheath may be either wholly or partially removed and the inner tube exposed and removed if desired.

In the construction shown in Figs. 1 to 6 of the drawings the projections 12 are integral with those portions of the wheel with which they are connected. I may, however, form these projections separately in the form of pins, as indicated at 21 in Fig. 7 of the drawings, these pins being fitted into sockets 22 in those portions of the rim of the wheel to which they are to be attached.

Instead of dividing the rim of the wheel only I may construct the entire wheel in two similar separable halves or sections, as shown in Figs. 8 and 9 of the drawings. In this construction the rim is radially divided throughout its entire depth and the wheel proper is composed of two disks 23, one-half of the rim being carried by the outer margin of each disk. In this construction I employ a separate hub 24, having a circumferential flange 25, provided with lateral ribs, against the outer faces of which the disks are held by means of bolts 26, passing through the inner margins of the disks and through the flange, as shown in Fig. 9. It will be noted that the disks diverge inwardly toward the center of the wheel in order to give the necessary strength to resist buckling. It will be understood, of course, that the removal and application of the tire are accomplished with this construction in the manner already described, with the exception that instead of separating or connecting the two sections of the rim of the wheel, as in the former construction, the two halves or sections of the wheel itself are separated or connected.

Although I have hereinbefore described my invention as embodied in a complete wheel, it is obvious that it may be constructed in the form of a rim adapted for application to a wheel in the same manner in which ordinary metal tires are applied to such wheels— as, for instance, shrinking on. In Fig. 10 of the drawings I have shown such a rim, divided in the manner already described and adapted for direct application to a wooden or other wheel either by shrinking it onto the same or by otherwise securing it thereto.

I do not wish to be understood as limiting myself to the precise details of construction hereinbefore described, and shown in the accompanying drawings, as these details may obviously be modified without departing from the principles of my invention.

I claim—

1. In a vehicle-wheel, an elastic tire consisting of an inner inflatable tube and an outer circumferentially-rifted sheath having its margins turned at right angles to form a radial projection, in combination with a wheel having a rim curved to fit the body of the tire, provided with an annular groove having a solid base to receive the projection of the tire and divided into annular separable sections having meeting faces which positively limit the approach of said sections, and fastening devices for uniting the sections and thereby clamping the projection of the tire, substantially as described.

2. In a vehicle-wheel, an elastic tire having an inwardly-extending circumferential web or rib formed integral therewith, in combination with a wheel-rim the outer face of which is curved to fit the body of the tire and is further provided with an annular groove centrally thereof to receive said web of the tire, said groove having a solid base against which the inner face of the web abuts, and said rib being formed of annular separable sections having meeting faces which positively limit the approach of said sections, and fastening devices for uniting the sections and thereby clamping the web of the tire, substantially as described.

3. In a vehicle-wheel, an elastic tire having a radial projection extending toward the wheel center, in combination with a wheel having a rim curved to fit the body of the tire, provided with an annular groove to receive the projection of the tire and divided into annular separable sections, each provided with pins or projections extending into the groove and adapted to enter and engage the projection of the tire, and fastening devices for uniting the sections and thereby clamping and securing the projection of the tire, substantially as described.

4. In a vehicle-wheel, an elastic tire consisting of an inner inflatable tube and an outer circumferentially-rifted sheath having its margins turned at right angles to form a radial projection, in combination with a rim curved to fit the body of the tire, provided with an annular groove to receive the projection of the tire and divided into annular separable sections, each provided with pins or projections extending into the groove and adapted to enter and engage the projection of the tire, and fastening devices for uniting the sections and thereby clamping and securing the projection of the tire, substantially as described.

5. In a vehicle-wheel, an elastic tire consisting of an inner inflatable tube and an outer circumferentially-rifted sheath having margins of uniform or substantially uniform thickness with the main part of said sheath and having said margins turned at right angles to form a radial projection, in combination with a wheel having a rim curved to fit the body of the tire, provided with an annular groove to receive the projection of the tire and divided into annular separable sections, one of which is rabbeted to form a seat for the other, each of said sections being provided with a marginal rib having sharp projections thereon at intervals extending into the groove, and clamping-bolts for uniting the sections and thereby clamping and securing the tire in position in the rim by means of its projection, substantially as described.

6. In a vehicle-wheel, an elastic tire having an inner circumferential web, in combination with a wheel having a rim curved to fit the body of the tire and provided with an annular groove to receive the web thereof, said rim being divided into annular separable sections, and each of said sections being provided with a series of sharp projections thereon at intervals extending into the groove, and clamping-bolts for uniting the sections, substantially as described.

7. In a vehicle-wheel, an elastic tire having an inner circumferential web, in combination with a wheel having a rim curved to fit the body of the tire and provided with an annular groove to receive the web thereof, said rim being divided into annular separable sections, one of which is rabbeted to form a seat for the other, said sections being provided respectively with marginal ribs, and these latter having a series of relatively offset sharp projections thereon extending into the groove, and clamping-bolts for uniting said sections and thereby forcing said projections into the web of the tire, substantially as described.

WILLIAM MORRISON.

Witnesses:
L. F. McCREA,
IRVINE MILLER.